United States Patent
Li et al.

(10) Patent No.: US 10,396,863 B2
(45) Date of Patent: Aug. 27, 2019

(54) METHOD FOR DETERMINING PARAMETERS FOR CONFIGURING REGULARIZED ZERO-FORCING PRECODER

(71) Applicant: MITSUBISHI ELECTRIC CORPORATION, Tokyo (JP)

(72) Inventors: Qianrui Li, Rennes (FR); Nicolas Gresset, Rennes (FR); David Gesbert, Rennes (FR); Paul De Kerret, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/062,260

(22) PCT Filed: Jan. 30, 2017

(86) PCT No.: PCT/JP2017/004137
§ 371 (c)(1),
(2) Date: Jun. 14, 2018

(87) PCT Pub. No.: WO2017/135464
PCT Pub. Date: Aug. 10, 2017

(65) Prior Publication Data
US 2018/0375548 A1    Dec. 27, 2018

(30) Foreign Application Priority Data
Feb. 4, 2016    (EP) ..................................... 16154332

(51) Int. Cl.
*H04B 7/024* (2017.01)
*H04B 7/0413* (2017.01)
(Continued)

(52) U.S. Cl.
CPC .......... *H04B 7/024* (2013.01); *H04B 7/0413* (2013.01); *H04B 7/0456* (2013.01); *H04B 7/0465* (2013.01); *H04B 7/0626* (2013.01)

(58) Field of Classification Search
CPC .... H04B 7/024; H04B 7/0456; H04B 7/0626; H04B 7/0413; H04B 7/0465
See application file for complete search history.

(56) References Cited

U.S. PATENT DOCUMENTS

| 9,048,970 B1 * | 6/2015 | Gomadam | ........... H04J 11/0033 |
| 2009/0075686 A1 * | 3/2009 | Gomadam | ........... H04B 7/0417 455/500 |

(Continued)

OTHER PUBLICATIONS

Wagner et al., "Large System Analysis of Linear Precoding in Correlated MISO Broadcast Channels Under Limited Feedback," IEEE Transactions on Information Theory, vol. 58, No. 7, Jul. 2012, pp. 4509-4537 (Year: 2012).*

(Continued)

*Primary Examiner* — Un C Cho
*Assistant Examiner* — Lalita W Pace
(74) *Attorney, Agent, or Firm* — Birch, Stewart, Kolasch & Birch, LLP (57) ABSTRACT

For determining parameters for configuring a regularized zero-forcing precoder aiming at being applied for transmitting data from a plurality of transmitters to a plurality of receivers via a MIMO transmission channel in a wireless communication system, and more particularly in a scope of massive MIMO approach, a first phase comprises: obtaining long-term statistics about observations of the MIMO transmission channel, and obtaining a power scaling factors aiming at meeting a power constraint P, by solving an optimization problem as a function of a signal to noise ratio asymptotic expression from the standpoint of each receiver. Then, a second phase comprises: obtaining an estimation of (Continued)

the MIMO transmission channel, and configuring the regularized zero-forcing precoder using the power scaling factors determined in the first phase as well as the obtained estimation of the MIMO transmission channel.

7 Claims, 4 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2011/0032839 A1* | 2/2011 | Chen | H04B 7/024 370/252 |
| 2011/0195678 A1* | 8/2011 | Luo | H04B 7/0617 455/114.3 |
| 2011/0299617 A1* | 12/2011 | Maddah-Ali | H04B 7/024 375/267 |
| 2012/0140848 A1* | 6/2012 | Lin | H04B 7/0413 375/296 |
| 2012/0177142 A1* | 7/2012 | Wagner | H04B 7/0452 375/296 |
| 2012/0281780 A1* | 11/2012 | Huang | H04B 7/0452 375/267 |
| 2012/0302280 A1* | 11/2012 | Seo | H04B 7/0417 455/522 |
| 2013/0089159 A1 | 4/2013 | Liu | |
| 2013/0142290 A1* | 6/2013 | Farmanbar | H04B 7/086 375/343 |
| 2014/0029522 A1 | 1/2014 | Farmanbar et al. | |
| 2014/0050202 A1* | 2/2014 | Baligh | H04B 7/024 370/336 |
| 2015/0070225 A1* | 3/2015 | Lee | H04W 52/42 343/703 |
| 2018/0359076 A1* | 12/2018 | Garcia Ordonez | H04B 7/0456 |

OTHER PUBLICATIONS

Li et al., "Robust Regularized ZF in Decentralized Broadcast Channel with Correlated CSI Noise", Fifty-third Annual Allerton Conference, Allerton House, UIUC, Illinois, USA, Sep. 29-Oct. 2, 2015, pp. 329-336.

* cited by examiner

METHOD FOR DETERMINING PARAMETERS FOR CONFIGURING REGULARIZED ZERO-FORCING PRECODER

TECHNICAL FIELD

The present invention generally relates to determining parameters of a regularized zero-forcing precoder to be applied for transmitting data from a plurality of transmitters to a plurality of receivers in a wireless communication system.

BACKGROUND ART

Communication systems may rely on cooperation in order to improve performance of the communication systems with regard to an environment of said communication systems. According to one example, such cooperation can be found in a context of a virtual MIMO (Multiple-Input Multiple-Output) channel-based communications network in which transmitter node devices, typically access points such as base stations or eNodeBs, cooperate in order to improve overall robustness of communications via the virtual MIMO channel toward receiver devices such as UEs (User Equipment). Precoding is often implemented in order to enable the transmitter node devices to cooperate.

SUMMARY OF INVENTION

Technical Problem

Zero-forcing (or Null-Steering) precoding is a method of spatial signal processing by which multiuser interference signals can be nulled in wireless communications, when the transmission channel is perfectly known at the transmitters side. Regularized-zero-forcing precoding is an enhanced processing to consider the impact of a background noise, unknown user interference, or imperfect channel knowledge at the transmitter. With a limited CSIT (Channel State Information at the Transmitter), the performance of regularized zero-forcing precoding decreases as the inaccuracy of the CSIT increases. It means that regularized zero-forcing precoding typically requires significant CSI (Channel State Information) exchange to avoid as much as possible inaccuracies of the CSIT and thus avoid significant throughput loss because of residual multiuser interferences. Moreover, in order to allow real-time adaptation of the regularized zero-forcing precoding to the transmission channel fluctuations, rather fast CSI exchange is needed between the transmitter node devices when the regularized zero-forcing precoding is configured in a distributed fashion and rather fast CSI exchange is needed from the transmitter node devices to a central processing unit when the regularized zero-forcing precoding is configured in a centralized fashion. This is a significant constraint in wireless communication systems design.

Solution to Problem

It is then desirable to overcome the aforementioned drawbacks of the prior art. More particularly, it is desirable to provide a solution that allows implementing regularized zero-forcing precoding that does not rely on such fast CSI exchange.

To that end, the present invention concerns a method for determining parameters for configuring a regularized zero-forcing precoder aiming at being applied for transmitting data from a plurality of n transmitters to a plurality of K receivers via a Multiple-Input Multiple Output MIMO transmission channel in a wireless communication system, each transmitter having a quantity $M_{TX}$ of transmit antennas, each receiver having a single receive antenna, $K \leq nM_{TX} = M$, the method comprising a first phase comprising: obtaining long-term statistics about observations of the MIMO transmission channel as follows, for any and all j-th transmitter among the n transmitters and any and all k-th receiver among the K receivers:

$\sigma_k^{(j)}$, which is representative of a ratio between an average power of the MIMO channel from said j-th transmitter to said k-th receiver and an average power of an estimation noise in Channel State Information at Transmitter CSIT obtained, at said j-th transmitter, when estimating the MIMO channel from said j-th transmitter to said k-th receiver;

$\Theta_k$, which is a covariance matrix of the MIMO channel from said plurality of transmitters toward said k-th receiver; and $\rho_k^{(j,j')}$, which is representative of a correlation between $q_k^{(j)}$ and $q_k^{(j')}$, wherein $q_k^{(j)}$ is a whitened estimation noise, obtained at the j-th transmitter, in the CSIT of the MIMO channel between said j-th transmitter and said k-th receiver, and wherein $q_k^{(j')}$ is a whitened estimation noise, obtained at the j'-th transmitter, in the CSIT of the MIMO channel between said j'-th transmitter and said k-th receiver;

The first phase further comprises: obtaining a power scaling factors vector $\mu^*$ gathering power scaling factors $\mu_j$ for any and all j-th transmitter among the n transmitters and aiming at meeting a power constraint P, by solving an optimization problem as a function of a signal to noise ratio asymptotic expression $SINR_k^o$ from the standpoint of each receiver as follows:

$$\mu^* = \underset{\mu}{\mathrm{argmax}} \sum_{k=1}^{K} \log(1 + SINR_k^o) \text{ such that}$$

$$\sum_{j=1}^{n} \mu_j^2 \frac{\Gamma_{j,j}^o(E_j E_j^\dagger)}{\Gamma_{j,j}^o(I_M)} = 1$$

wherein $E_j^\dagger \in \mathbb{C}^{M_{TX} \times M}$ is a matrix defined as follows:

$$E_j^\dagger = [0_{M_{TX} \times (j-1)M_{TX}} I_{M_{TX}} 0_{M_{TX} \times (n-j)M_{TX}}]$$

wherein the notation $I_Z$ means an identity matrix or sub-matrix of size Z and the notation $0_{Z \times W}$ means a null sub-matrix of size $Z \times W$, wherein the asymptotic expression $SINR_k^o$ of the signal to noise ratio from the standpoint of any k-th receiver among the K receivers is as follows:

$$SINR_k^o = \frac{P\left(\sum_{j=1}^{n} \mu_j \sqrt{\frac{c_{0,k}^{(j)}}{\Gamma_{j,j}^o(I_M)}} \frac{\Phi_{j,k}}{1 + m_k^{(j)}}\right)^2}{1 + I_k^o}$$

wherein $I_k^o$ is as follows:

$$I_k^o = P \sum_{j=1}^{n} \sum_{j'=1}^{n} \frac{\mu_j \mu_{j'}}{\sqrt{\Gamma_{j,j}^o(I_M)\Gamma_{j',j'}^o(I_M)}} \left( \Gamma_{j,j'}^o(E_{j'}E_{j'}^\dagger \Theta_k E_j E_j^\dagger) - \right.$$

$$2\Gamma_{j,j'}^o(\Theta_k E_j E_j^\dagger) \frac{c_{0,k}^{(j')} \Phi_{j',k}}{1 + m_k^{(j')}} +$$

$$\left. \Phi_{j',k} \Phi_{j,k} \gamma_{j,j',k} \frac{c_{0,k}^{(j)} c_{0,k}^{(j')} + \rho_k^{(j,j')} c_{2,k}^{(j)} c_{2,k}^{(j')}}{\left(1 + m_k^{(j)}\right)\left(1 + m_k^{(j')}\right)} \right)$$

wherein $\Gamma_{j,j'}^o$, is a function defined as follows:

$$\Gamma_{j,j'}^o(X) =$$

$$\frac{1}{M} \sum_{k=1}^{K} \frac{\left( \sqrt{c_{0,k}^{(j)} c_{0,k}^{(j')}} + \sqrt{c_{1,k}^{(j)} c_{1,k}^{(j')}} \rho_k^{(j,j')} \right) \frac{1}{M} \text{Trace}(\Theta_k Q_o^{(j')} X Q_o^{(j)})}{\left(1 + m_k^{(j)}\right)\left(1 + m_k^{(j')}\right)} +$$

$$\frac{1}{M} \sum_{k=1}^{K} \frac{\left( \sqrt{c_{0,k}^{(j)} c_{0,k}^{(j')}} + \sqrt{c_{1,k}^{(j)} c_{1,k}^{(j')}} \rho_k^{(j,j')} \right)^2 \gamma_{j,j',k} \frac{1}{M} \text{Trace}(\Theta_k Q_o^{(j')} X Q_o^{(j)})}{\left(1 + m_k^{(j)}\right)\left(1 + m_k^{(j')}\right)}$$

with $c_{0,k}^{(j)} = 1 - \left(\sigma_k^{(j)}\right)^2$ and $$c_{1,k}^{(j)} = \left(\sigma_k^{(j)}\right)^2 \text{ and } c_{2,k}^{(j)} = \sigma_k^{(j)} \sqrt{1 - \left(\sigma_k^{(j)}\right)^2}$$

wherein $$Q_o^{(j)} = \left( \frac{1}{M} \sum_{k=1}^{K} \frac{\Theta_k}{1 + m_k^{(j)}} + \alpha_j I_M \right)^{-1}$$

wherein $$m_k^{(j)} = \frac{1}{M} \text{Trace}\left( \Theta_k \left( \frac{1}{M} \sum_{\ell=1}^{K} \frac{\Theta_\ell}{1 + m_\ell^{(j)}} + \alpha_j I_M \right)^{-1} \right)$$

wherein $\alpha_j$ is a regularization coefficient of the regularized zero-forcing precoder T, wherein $\gamma_{j,j',k}$ (with k=1, ..., K) is the k-th entry of the vector $\gamma_{j,j'} \in \mathbb{C}^{K \times 1}$ which is such that:

$$(I - A'_{j,j'}) \gamma = b'_{j,j'}$$

wherein $A'_{j,j'} \in \mathbb{C}^{K \times K}$ is a matrix having an entry at each index l, t equal to:

$$[A'_{j,j'}]_{\ell,t} = \frac{\left( \sqrt{c_{0,t}^{(j)} c_{0,t}^{(j')}} + \sqrt{c_{1,t}^{(j)} c_{1,t}^{(j')}} \rho_t^{(j,j')} \right)^2}{M\left(1 + m_t^{(j)}\right)\left(1 + m_t^{(j')}\right)} \frac{\text{Trace}(\Theta_t Q_o^{(j')} \Theta_\ell Q_o^{(j)})}{M}$$

wherein $b'_{j,j'}$ is a vector having an entry at each index l equal to $$[b'_{j,j'}]_\ell = \frac{1}{M} \sum_{k=1}^{K} \frac{\sqrt{c_{0,t}^{(j)} c_{0,t}^{(j')}} + \sqrt{c_{1,t}^{(j)} c_{1,t}^{(j')}} \rho_t^{(j,j')}}{M\left(1 + m_t^{(j)}\right)\left(1 + m_t^{(j')}\right)} \frac{\text{Trace}(\Theta_t Q_o^{(j')} \Theta_\ell Q_o^{(j)})}{M}$$

and wherein $\Phi_{j,k}$ is defined as follows:

$$\Phi_{j,k} = \frac{\text{Trace}(\Theta_k E_j E_j^\dagger Q_o^{(j)})}{M}$$

Moreover, the method further comprises a second phase, performed independently by any and all transmitters of said plurality of n transmitters, comprising: obtaining an estimation $\hat{H}^{(j)}$ of the MIMO transmission channel from the standpoint of each j-th transmitter of said plurality of n transmitters; and configuring the regularized zero-forcing precoder T as follows:

$$T_j^{(j)} = \mu_j E_j^\dagger \left( \left((\hat{H}^{(j)})^\dagger \hat{H}^{(j)} + M \alpha_j I_M \right)^{-1} (\hat{H}^{(j)})^\dagger \frac{\sqrt{P}}{\sqrt{\Psi^{(j)}}} \right)$$

wherein $T_j^{(j)}$ represents the parameters of the regularized zero-forcing precoder T which have to be applied by said j-th transmitter, and wherein $\Psi^{(j)}$ is a power normalization scalar defined as follows:

$$\Psi^{(j)} = \|((\hat{H}^{(j)})^\dagger \hat{H}^{(j)} + M\alpha_j I_M)^{-1} (\hat{H}^{(j)})^\dagger\|_F^2$$

wherein $\mu_j$ results from the execution of the first phase.

Thus, regularized zero-forcing precoding is implemented, with good performance especially in a scope of massive MIMO approach, without having to rely on such fast CSI exchange since only long-term statistics are exchanged instead.

According to a particular feature, solving the optimization problem as a function of the signal to noise ratio asymptotic expression $\text{SINR}_k^o$ from the standpoint of each receiver consists in solving:

$$\mu^* = \max_\mu \sum_{k=1}^{K} \log\left(1 + \frac{\mu^T A_k \mu}{\frac{1}{P} + \mu^T B_k \mu}\right)$$

such that $\|C\mu\|_F^2 = 1$, wherein $A_k$ is representative of a channel on which are carried symbols intended to the k-th receiver among the K receivers from a long term and asymptotic perspective, $B_k$ is representative of the channel on which are carried symbols intended to all receivers but said k-th receiver and generating interference with symbols intended to said k-th receiver from a long term and asymptotic perspective, and C is representative of the power constraint, and $A_k$ is a constant matrix having an entry at each index j,j' equal to:

$$[A_k]_{j,j'} = \sqrt{\frac{c_{0,k}^{(j)} c_{0,k}^{(j')}}{\Gamma_{j,j}^o(I_M) \Gamma_{j',j'}^o(I_M)}} \frac{\Phi_{j,k} \Phi_{j',k}}{\left(1 + m_k^{(j)}\right)\left(1 + m_k^{(j')}\right)}$$

and $B_k$ is a constant matrix having an entry at each index j,j' equal to:

$$[B_k]_{j,j'} = \frac{1}{\sqrt{\Gamma_{j,j}^o(I_M) \Gamma_{j',j'}^o(I_M)}}$$

-continued $$\left(\Gamma_{j,j'}^o(E_{j'}E_{j'}^\dagger \Theta_k E_j E_j^\dagger) - 2\operatorname{Re}\{\Gamma_{j,j'}^o(\Theta_k E_j E_j^\dagger)\}\frac{c_{0,k}^{(j')}\Phi_{j',k}}{1+m_k^{(j')}} + \right.$$

$$\left. \Phi_{j',k}\Phi_{j,k}\gamma_{j,j',k}\frac{c_{0,k}^{(j)}c_{0,k}^{(j')} + \rho_k^{(j,j')}c_{2,k}^{(j)}c_{2,k}^{(j')}}{(1+m_k^{(j)})(1+m_k^{(j')})}\right)$$

$$C = \operatorname{diag}\left(\sqrt{\frac{\Gamma_{1,1}^o(E_1 E_1^\dagger)}{\Gamma_{1,1}^o(I_M)}}, \ldots, \sqrt{\frac{\Gamma_{n,n}^o(E_n E_n^\dagger)}{\Gamma_{n,n}^o(I_M)}}\right)$$

wherein Re{X} represents the real part of the complex input X, and diag( ) is a function that forms a diagonal matrix of size Z when Z entries are input to said function. Thus, solving the optimization problem as a function of the signal to noise ratio asymptotic expression $SINR_k^o$ from the standpoint of each receiver is simplified.

According to a particular feature, the regularization coefficient $\alpha_j$ is jointly optimized with the power scaling factor $\mu_j$ by solving:

$$(\alpha^*, \mu^*) = \operatorname*{argmax}_{(\alpha,\mu)} \sum_{k=1}^{K} \log(1 + SINR_k^o)$$

such that $$\sum_{j=1}^{n} \mu_j^2 \frac{\Gamma_{j,j}^o(E_j E_j^\dagger)}{\Gamma_{j,j}^o(I_M)} = 1$$

wherein $\alpha^*$ is a regularization coefficients vector gathering the regularization coefficients $\alpha_j$ for any and all j-th transmitter among the n transmitters. Thus, by relying on jointly optimized regularization coefficient $\alpha_j$ and power scaling factor $\mu_j$ for any and all j-th transmitter among the n transmitters, the performance of the configuration of the regularized zero-forcing precoder T, with respect to the effective signal to noise ratio, is increased.

According to a particular feature, the first phase is implemented in a distributed fashion by any and all transmitter of said plurality of transmitters, and said plurality of transmitters shares said long-term statistics. Thus, the method can be implemented by relying on a simple architecture of the wireless communication system for performing cooperative transmissions in from the plurality of transmitters to the plurality of receivers.

According to a particular feature, a server obtains said long-term statistics from said plurality of transmitters and the server implements said first phase on behalf of any and all transmitters of said plurality of transmitters. Thus, the main processing resources are centralized in a sever, which further limits the exchanges of the long-term statistics in the wireless communication system.

The present invention also concerns a wireless communication system configured for performing the aforementioned method.

The present invention also concerns a computer program that can be downloaded from a communications network and/or stored on a medium that can be read by a computer or processing device. This computer program comprises instructions for causing implementation of the aforementioned method, when said program is run by a processor. The present invention also concerns an information storage medium, storing a computer program comprising a set of instructions causing implementation of the aforementioned method, in any one of its embodiments, when the stored information is read from said information storage medium and run by a processor.

The characteristics of the invention will emerge more clearly from a reading of the following description of an example of embodiment, said description being produced with reference to the accompanying drawings.

DESCRIPTION OF EMBODIMENTS

For determining parameters for configuring a regularized zero-forcing precoder aiming at being applied for transmitting data from a plurality of transmitters to a plurality of receivers via a MIMO transmission channel in a wireless communication system, and more particularly in a scope of massive MIMO approach, a first phase comprises: obtaining long-term statistics about observations of the MIMO transmission channel, and obtaining a power scaling factors aiming at meeting a power constraint P, by solving an optimization problem as a function of a signal to noise ratio asymptotic expression from the standpoint of each receiver. The first phase is detailed hereafter with regard to FIGS. 3 to 5. The first phase aims at determining long-term parameters of the regularized zero-forcing precoder, including power scaling factors and, potentially in a joint fashion, regularization coefficients. Then, a second phase comprises: obtaining an estimation of the MIMO transmission channel, and configuring the regularized zero-forcing precoder using the power scaling factors determined in the first phase as well as the obtained estimation of the MIMO transmission channel. The second phase is detailed hereafter with regard to FIG. 6. The second phase aims at refining, on a short-term basis, the regularized zero-forcing precoder on the basis of the long-term parameters and of an estimation of the effective MIMO transmission channel.

Figure 1A:
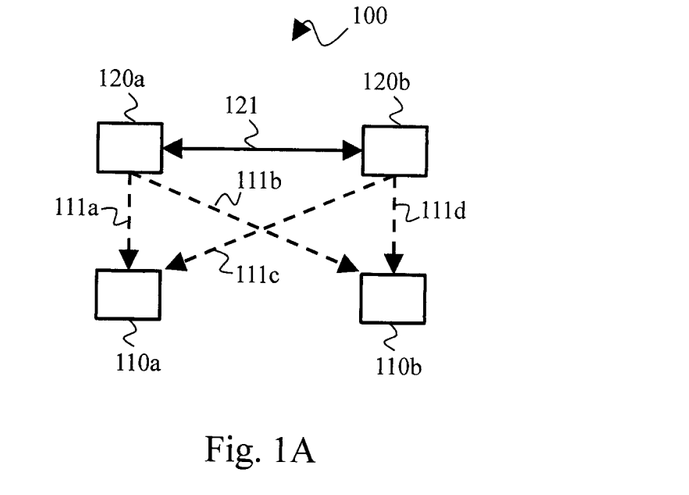
FIG. 1A schematically represents a first architecture of a wireless communication system in which the present invention may be implemented.

FIG. 1A schematically represents a first architecture of a wireless communication system 100 in which the present invention may be implemented.

The wireless communication system 100 comprises a plurality of transmitters, two 120a, 120b of which being represented in FIG. 1A. The wireless communication system 100 further comprises a plurality of receivers, two 110a, 110b of which being represented in FIG. 1A. For instance, the transmitters 120a, 120b are access points or base stations of a wireless telecommunications network, and the receivers 110a, 110b are mobile terminals having access to the wireless telecommunications network via said access points or base stations. The transmitters 120a, 120b cooperate with each other in order to improve performance when performing transmissions from the plurality of transmitters 120a, 120b toward the plurality of receivers 110a, 110b via wireless links 111a, 111b, 111c, 111d. The wireless link 111a represents the transmission channel from the transmitter 120a to the receiver 110a, the wireless link 111b represents the transmission channel from the transmitter 120a to the receiver 110b, the wireless link 111c represents the transmission channel from the transmitter 120b to the receiver 110a, and the wireless link 111d represents the transmission channel from the transmitter 120b to the receiver 110b. The transmitters 120a, 120b are interconnected, as shown by a link 121 in FIG. 1A, so as to be able to exchange long-term statistics about transmission channel observations. The link 121 can be wired or wireless.

The cooperation is achieved by making the transmitters 120a, 120b jointly apply a regularized zero-forcing precoder T when performing said transmissions. The parameters of the regularized zero-forcing precoder T are determined in a distributed fashion within the wireless communication system illustrated in FIG. 1A, so that each transmitter determines the parameters of the regularized zero-forcing precoder T which have to be applied by said transmitter in the scope of said transmissions.

Herein the quantity of transmitters 120a, 120b in use is denoted n, each transmitter having a quantity $M_{TX}$ of transmit antennas, and the quantity of receivers 110a, 110b in use is denoted K, each receiver having a single receive antenna. Considering the transmissions from the plurality of transmitters 120a, 120b toward the plurality of receivers 110a, 110b, it then means that the total quantity M of transmit antennas in the wireless communication system 100 equals to $nM_{TX}$ and the total quantity of receive antennas in the wireless communication system 100 equals to K. The ratio β of the total quantity of the transmit antennas with respect to the total quantity of the receive antennas in the wireless communication system 100 is defined as follows:

$$\beta = \frac{M}{K} \geq 1$$

The receivers 110a, 110b are configured to simultaneously receive signals from plural transmitters among the n transmitters. A global MIMO channel $H=[h_1, h_2, \ldots, h_K]^\dagger$ is thus created between the n transmitters and the K receivers, wherein $h_k$ represents the MIMO channel from the n transmitters to the k-th receiver (1≤k≤K) among the K receivers.

Let's consider a symbol vector $s_k$ intended to the k-th receiver among the K receivers and let's denote s a stacked vector $s=[s_1, s_2, \ldots, s_K]^T$ that contains all data to be transmitted by the n transmitters to the K receivers at a given instant, wherein $A^T$ represents the transpose of a vector or matrix A.

For transmitting the stacked vector s to the K receivers in a cooperative manner, the n transmitters jointly apply the regularized zero-forcing precoder T, which implies that a multi-user signal x is transmitted via the global MIMO channel, as follows:

$$x = Ts = \sum_{k=1}^{K} t_k s_k$$

wherein $T=[t_1, t_2, \ldots, t_K]^T$, wherein $t_k$ represents a beamforming vector implied by the precoder T to address the k-th receiver (1≤k≤K) among the K receivers.

Considering an overall signal $y=[y_1, y_2, \ldots, y_K]^T$ received by the K receivers as a whole, the following relationship can be expressed:

$$y = Hx + n'$$

which can also be expressed as follows:

$$y_k = h_k x_k + n'_k$$

wherein $y_k$ represents the signal effectively received by the k-th receiver (1≤k≤K) among the K receivers when the vector $s_k$ was intended to said k-th receiver, and wherein $n'=[n'_1, n'_2, \ldots, n'_K]^T$ represents the additive noise, independent of the transmitted vector x, with $n'_k$ (1≤k≤K) representing the noise incurred by said k-th receiver during the transmission of the vector $x_k$ via the MIMO channel $h_k$. It has to be noted that the noise n has independent identically distributed entries $n'_k$.

The parameters of the regularized zero-forcing precoder T have to be optimized under the following power constraint:

$$\text{Trace}(TT^\dagger) = P$$

wherein P is the total transmit power for the n transmitters as a whole.

Optimization of the parameters of the regularized zero-forcing precoder T is detailed hereinafter with regard to FIGS. 3 to 6.

Figure 1B:
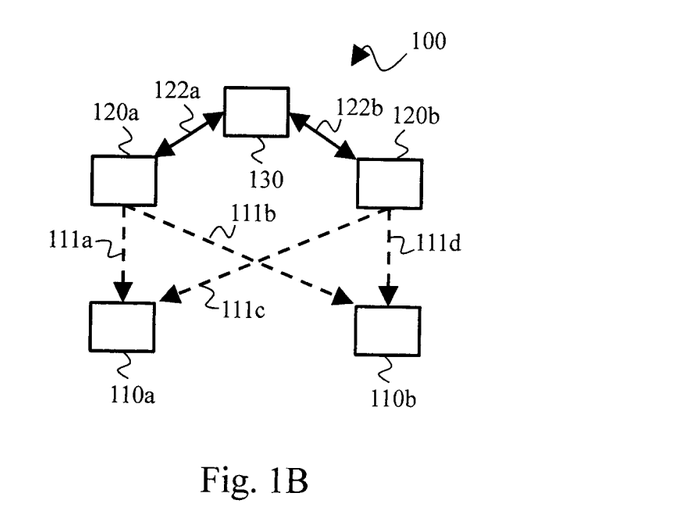
FIG. 1B schematically represents a second architecture of a wireless communication system in which the present invention may be implemented.

FIG. 1B schematically represents a second architecture of the wireless communication system 100 in which the present invention may be implemented. The architecture illustrated in FIG. 1B differs from the architecture illustrated in FIG. 1A in that, in FIG. 1B, the wireless communication system 100 further comprises a server 130. Instead of being interconnected as shown in FIG. 1A, the transmitters 120a, 120b are connected, as shown by respective links 122a, 122b in FIG. 1B, so as to be able to transmit to the server 130 long-term statistics about transmission channel observations and to receive from the server 130 the parameters of the regularized zero-forcing precoder T to be respectively applied by the transmitters 120a, 120b. The links 122a, 122b can be wired or wireless.

The parameters of the regularized zero-forcing precoder T are determined in a centralized fashion within the wireless communication system illustrated in FIG. 1B, so that the server 130 performs optimization of parameters of the regularized zero-forcing precoder T, as detailed hereinafter with regard to FIGS. 3 to 5. Other parameters of the regularized zero-forcing precoder T are then determined by each one of the n transmitters on its own, as detailed hereinafter with regard to FIG. 6.

Figure 2:
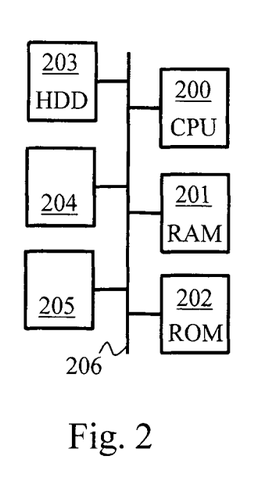
FIG. 2 schematically represents an hardware architecture of a communication device, as used in the wireless communication system.

FIG. 2 schematically represents an example of hardware architecture of a communication device, as used in the wireless communication system 100. The hardware architecture illustratively shown in FIG. 2 can represent each transmitter 120a, 120b of the wireless communication system 100 and/or each receiver 110a, 110b of the wireless communication system 100 and/or the server 130.

According to the shown architecture, the communication device comprises the following components interconnected by a communications bus 206: a processor, microprocessor, microcontroller or CPU (Central Processing Unit) 200; a RAM (Random-Access Memory) 201; a ROM (Read-Only Memory) 202; an SD (Secure Digital) card reader 203, or an HDD (Hard Disk Drive) or any other device adapted to read information stored on a storage medium; and a first communication interface 204 and potentially a second communication interface 205.

When the communication device represents one receiver of the wireless communication system 100, the first communication interface 204 enables the communication device to receive data from the n transmitters via the global MIMO channel H. The second communication interface 205 is not necessary in this case. The first communication interface 204 further enables the communication device to feed back channel state information to one or more transmitter devices among the n transmitters.

When the communication device represents one transmitter of the wireless communication system 100, the first communication interface 204 enables the communication device to transmit data, via the global MIMO channel H. The first communication interface 204 further enables the communication device to receive channel state information fed back by one or more receivers among the K receivers. Moreover, according to the architecture shown in FIG. 1A, the second communication interface 205 enables the communication device to exchange data with one or more other transmitters of the wireless communication system 100. Finally, according to the architecture shown in FIG. 1B, the second communication interface 205 enables the communication device to exchange data with the server 130.

When the communication device represents the server 130, the first communication interface 204 enables the communication device to exchange data with any one of the n transmitters of the wireless communication system 100. The second communication interface 205 is not necessary in this case.

CPU 200 is capable of executing instructions loaded into RAM 201 from ROM 202 or from an external memory, such as an SD card. After the communication device has been powered on, CPU 200 is capable of reading instructions from RAM 201 and executing these instructions. The instructions form one computer program that causes CPU 200 to perform some or all of the steps of the algorithm described hereafter with respect to FIGS. 3 to 5.

Figure 3:
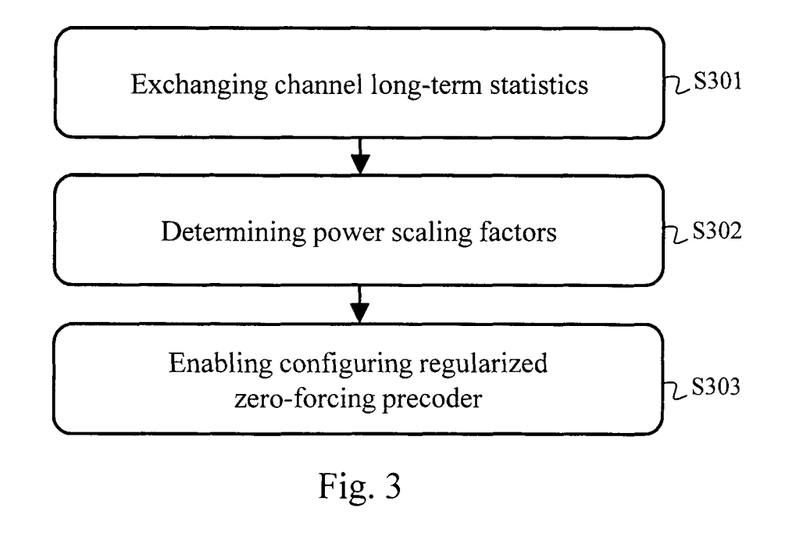
FIG. 3 schematically represents an algorithm for determining power scaling factors for enabling configuring a regularized zero-forcing precoder intended to be applied for transmitting data, in a cooperative manner, from a plurality of transmitters toward a plurality of receivers in the wireless communication system.
Figure 4:
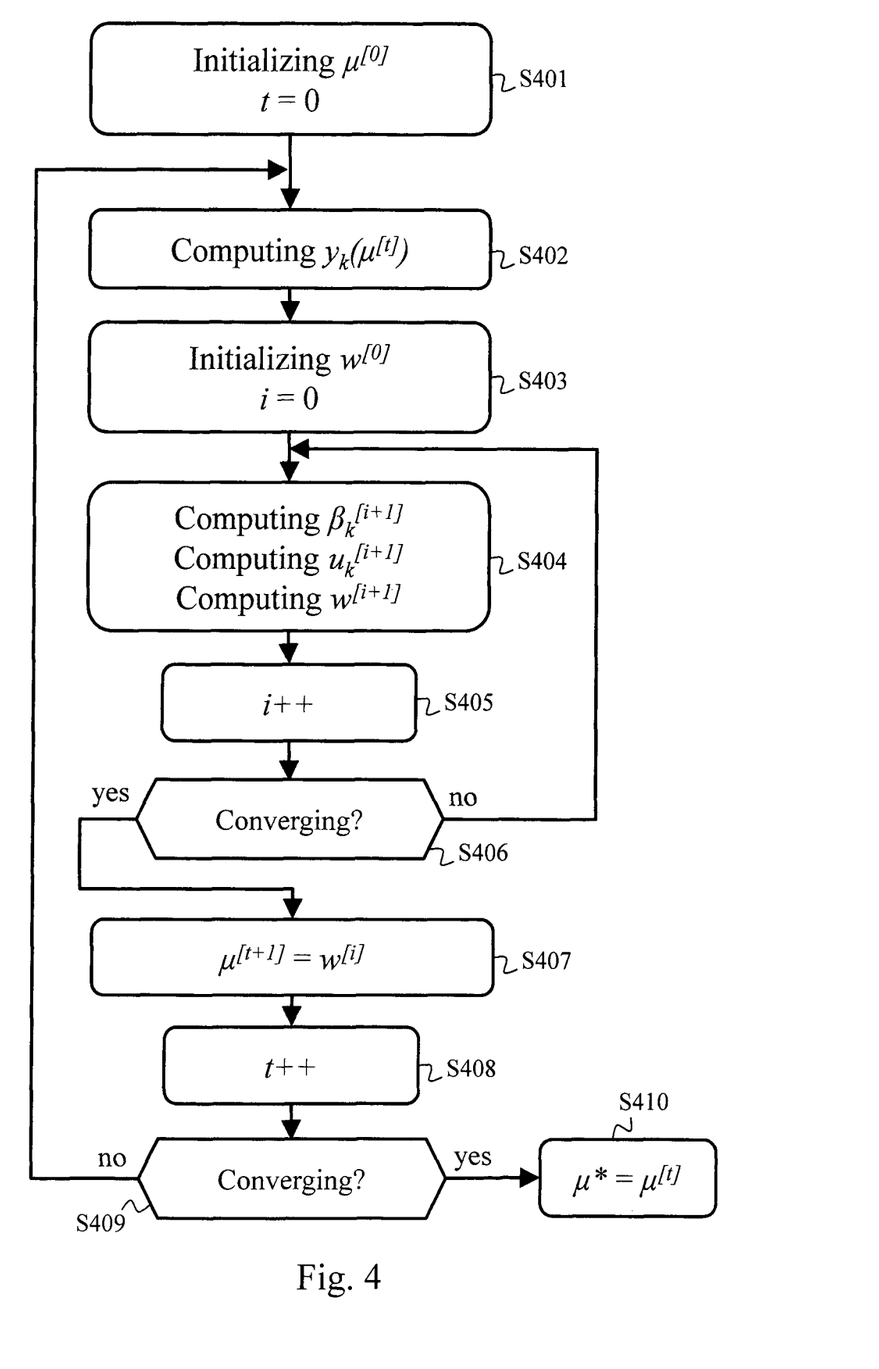
FIG. 4 schematically represents an algorithm for determining the power scaling factors in the scope of the algorithm of FIG. 3, according to a particular embodiment of the present invention.
Figure 5:
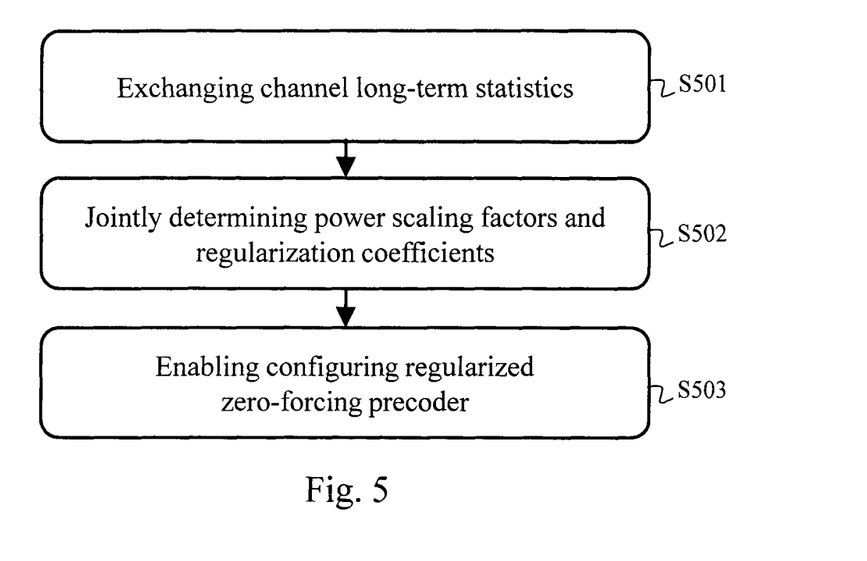
FIG. 5 schematically represents an algorithm for jointly determining the power scaling factors and regularization coefficients for enabling configuring the regularized zero-forcing precoder intended to be applied for transmitting data, in a cooperative manner, from the plurality of transmitters toward the plurality of receivers in the wireless communication system.

Any and all steps of the algorithms described hereafter with respect to FIGS. 3 to 5 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 schematically represents an algorithm for jointly determining power scaling factors $\mu_j$ (j=1 to n) for enabling configuring the regularized zero-forcing precoder T intended to be applied for transmitting data, in a cooperative manner, from the plurality of transmitters 120a, 120b toward the plurality of receivers 110a, 110b in the wireless communication system 100. The algorithm of FIG. 3 is performed in parallel by each transmitter 120a, 120b of the wireless communication system 100 in the scope of the architecture shown in FIG. 1A, and the algorithm of FIG. 3 is performed by the server 130 in the scope of the architecture shown in FIG. 1B. Let's illustratively consider that the algorithm of FIG. 3 is performed by the transmitter 120a.

It is considered in the scope of the algorithm of FIG. 3 that the regularized zero-forcing precoder T is defined by regularization coefficients $\alpha_j$, with j=1 to n, which can be represented by a stacked regularization coefficients vector $\alpha=[\alpha_1, \alpha_2, \ldots, \alpha_n]^T$, in addition to a set formed by the power scaling factors $\mu_j$, with j=1 to n, which can be represented by a stacked power scaling factors vector $\mu=[\mu_1, \mu_2, \ldots, \mu_n]^T$.

It is further considered in the scope of the algorithm of FIG. 3 that the regularization coefficients $\alpha_j$ are fixed. The regularization coefficients $\alpha_j$ are predetermined according to a typical operational scheme (as known as functional point) of the wireless communication system 100, for example considering a predefined signal to noise ratio, or predefined signal to noise plus interference ratio. The regularization coefficients $\alpha_j$ are, in a variant embodiment, predetermined using an optimization process, as described in the document "*Robust Regularized ZF in Decentralized Broadcast Channel with Correlated CSI Noise*", Qianrui Li et al, 53*rd Annual Allerton Conference on Communication, Control and Computing*, 2015.

In a step S301, the transmitter 120a obtains long-term statistics so as to allow the transmitter 120a to build CSIT (Channel State Information at the Transmitter) related long-term statistics enabling the transmitter 120a to obtain a statistical view of the global MIMO channel H. The transmitter 120a builds the CSIT from feedback CSI (Channel State Information) from one more receivers among the K receivers, and/or channel estimation performed at said transmitter 120a using a channel reciprocity property.

More particularly, said long-term statistics are:

$\sigma_k^{(j)}$, which is representative of the ratio between the average power of the real MIMO channel from the j-th transmitter among the n transmitters to the k-th receiver among the K receivers and the average power of an estimation noise in the CSIT obtained, at said j-th transmitter, when estimating said MIMO channel from said j-th transmitter to said k-th receiver;

$\Theta_k$, which is a covariance matrix representative of the covariance of the MIMO channel $h_k$; and $\rho_k^{(j,j')}$, which is representative of a correlation between $q_k^{(j)}$ and $q_k^{(j')}$, wherein $q_k^{(j)}$ (resp. $q_k^{(j')}$) is a whitened estimation noise, obtained at the j-th transmitter (resp. j'-th transmitter) among the n transmitters, in the CSIT of the channel between said j-th transmitter (resp. j'-th transmitter) and the k-th receiver among the K receivers.

By denoting $\hat{h}_k^{(j)}$ the CSIT at said j-th transmitter, the following relationship can be expressed:

$$\hat{h}_k^{(j)} = \sqrt{1-(\sigma_k^{(j)})^2} h_k + \sigma_k^{(j)} \delta_k^{(j)}$$

wherein $\delta_k^{(j)}$ represents an estimation error mostly caused by a quantization of the MIMO channel $h_k$ by the k-th receiver among the K receivers when transmitting the CSI feedback to said j-th transmitter, and is decomposed as $$\delta_k^{(j)} = \sqrt{M}\,\Theta_k^{\frac{1}{2}}q_k^{(j)}$$

First, the covariance matrix $\Theta_k$ is directly estimated at said k-th receiver from observations of the realization of $h_k$ and is fed back to at least one transmitter such as said j-th transmitter. Then, the long term statistics $\sigma_k^{(j)}$ can be computed as one minus the ratio between the variance of the input of the quantization and the variance of the output of the quantization. This can be determined at said k-th receiver from several observations of the realizations of the MIMO channel $h_k$ and fed back to said j-th transmitter, or computed at said j-th transmitter, which also knows the quantization properties, by using a training set of inputs of the quantization, with the same distribution as $h_k$. Finally, the variable $q_k^{(j)}$ can be computed at said k-th receiver from the knowledge of $h_k$, $\hat{h}_k^{(j)}$, $\sigma_k^{(j)}$ and $\Theta_k$. The same process of course applies for $q_k^{(j')}$ with respect to the j'-th transmitter among the n transmitters. In a first approach, the variables $q_k^{(j)}$ and $q_k^{(j')}$ are fed back to both j-th and j'-th transmitters, which allows them to compute the correlation $\rho_k^{(j,j')}$ between $q_k^{(j)}$ and $q_k^{(j')}$. In another approach, the properties of the quantization from said k-th receiver to said j-th and j'-th transmitter have to be known by said j-th transmitter, and said j-th transmitter can use a training set on $h_k$ for both quantization in order to evaluate the correlation $\rho_k^{(j,j')}$ from the knowledge of $\Theta_k$, $\sigma_k^{(j)}$ and $\sigma_k^{(j')}$. First, the j-th transmitter generates a random realization of $h_k$ according to its distribution which at least depends on $\Theta_k$, then, by knowing $\sigma_k^{(j)}$ and the quantization from the k-th receiver to the j-th transmitter, the j-th transmitter can evaluate the quantized version $\hat{h}_k^{(j)}$ and compute $\sigma_k^{(j)}\delta_k^{(j)}$ from which the j-th transmitter can compute $q_k^{(j)}$. The j-th transmitter applies the same process for $q_k^{(j')}$ and can evaluate $\rho_k^{(j,j')}$ by repeating these operations several times and estimating the correlation between the realizations of $q_k^{(j)}$ and $q_k^{(j')}$. Yet another approach is that the correlation $\rho_k^{(j,j')}$ between $q_k^{(j)}$ and $q_k^{(j')}$ is computed by said k-th receiver and then fed back to said j-th and j'-th transmitters.

Then, each transmitter provide at least part of said long-term statistics to the other transmitters of the wireless communication system 100 (in the scope of the architecture of FIG. 1A), such that all the transmitters 120a, 120b of the wireless communications system 100 share the same knowledge on said long-term statistics. In the scope of the architecture of FIG. 1B, each transmitter provide at least part of said long-term statistics to the server 130, such that said long-term statistics are entirely known to the server 130.

In a following step S302, the transmitter 120a obtains the power scaling factors vector $\mu$ by solving an optimization problem that can be formulated as a function of an asymptotic expression $SINR_k^\circ$ of the signal to noise ratio from the standpoint of each receiver (as identified by the index k taking the values from 1 to K), as follows, wherein $\mu^*$ represents the optimized power scaling factors vector y:

$$\mu^* = \underset{\mu}{\arg\max} \sum_{k=1}^{K} \log(1 + SINR_k^\circ)$$

such that $$\sum_{j=1}^{n} \mu_j^2 \frac{\Gamma_{j,j}^\circ(E_j E_j^\dagger)}{\Gamma_{j,j}^\circ(I_M)} = 1$$

wherein $E_j^\dagger \in \mathbb{C}^{M_T \times M}$ is a matrix defined as follows:

$$E_j^\dagger = [0_{M_{TX} \times (j-1)M_{TX}}\, I_{M_{TX}}\, 0_{M_{TX} \times (n-j)M_{TX}}]$$

wherein $I_Z$ is an identity matrix or sub-matrix of size Z and $O_{Z \times W}$ is a null sub-matrix of size Z×W, wherein the asymptotic expression $SINR_k^\circ$ of the signal to noise ratio from the standpoint of the k-th receiver among the K receivers of the wireless communication system 100 is expressed as follows:

$$SINR_k^\circ = \frac{P\left(\sum_{j=1}^{n} \mu_j \sqrt{\frac{c_{0,k}^{(j)}}{\Gamma_{j,j}^\circ(I_M)}} \frac{\Phi_{j,k}}{1+m_k^{(j)}}\right)^2}{1+I_k^\circ}$$

wherein $I_k^\circ \in \mathbb{R}$ is expressed as follows:

$$I_k^\circ = P \sum_{j=1}^{n} \sum_{j'=1}^{n} \frac{\mu_j \mu_{j'}}{\sqrt{\Gamma_{j,j}^\circ(I_M)\Gamma_{j',j'}^\circ(I_M)}} \left( \Gamma_{j,j'}^\circ(E_{j'}E_{j'}^\dagger \Theta_k E_j E_j^\dagger) - 2\Gamma_{j,j'}^\circ(\Theta_k E_j E_j^\dagger) \right.$$

$$\left. \frac{c_{0,k}^{(j')}\Phi_{j',k}}{1+m_k^{(j')}} + \Phi_{j',k}\Phi_{j,k}\gamma_{j,j',k} \frac{c_{0,k}^{(j)}c_{0,k}^{(j')} + \rho_k^{(j,j')}c_{2,k}^{(j)}c_{2,k}^{(j')}}{(1+m_k^{(j)})(1+m_k^{(j')})}\right)$$

wherein $\Gamma_{j,j'}^\circ : \mathbb{C}^{M \times M} \mapsto \mathbb{C}$ is a function defined as follows:

$$\Gamma_{j,j'}^\circ(X) = $$

$$\frac{1}{M}\sum_{k=1}^{K} \frac{\left(\sqrt{c_{0,k}^{(j)}c_{0,k}^{(j')}} + \sqrt{c_{1,k}^{(j)}c_{1,k}^{(j')}}\,\rho_k^{(j,j')}\right)\frac{1}{M}\mathrm{Trace}(\Theta_k Q_o^{(j')} X Q_o^{(j)})}{(1+m_k^{(j)})(1+m_k^{(j')})} +$$

$$\frac{1}{M}\sum_{k=1}^{K} \frac{\left(\sqrt{c_{0,k}^{(j)}c_{0,k}^{(j')}} + \sqrt{c_{1,k}^{(j)}c_{1,k}^{(j')}}\,\rho_k^{(j,j')}\right)^2 \gamma_{j,j',k}\frac{1}{M}\mathrm{Trace}(\Theta_k Q_o^{(j')} X Q_o^{(j)})}{(1+m_k^{(j)})(1+m_k^{(j')})}$$

with $c_{0,k}^{(j)} = 1 - (\sigma_k^{(j)})^2$ and $c_{1,k}^{(j)} = (\sigma_k^{(j)})^2$ and $c_{2,k}^{(j)} = \sigma_k^{(j)}\sqrt{1-(\sigma_k^{(j)})^2}$ wherein $$Q_o^{(j)} = \left(\frac{1}{M}\sum_{k=1}^{K} \frac{\Theta_k}{1+m_k^{(j)}} + \alpha_j I_M\right)^{-1}$$

wherein $$m_k^{(j)} = \frac{1}{M}\mathrm{Trace}\left(\Theta_k\left(\frac{1}{M}\sum_{\ell=1}^{K}\frac{\Theta_\ell}{1+m_\ell^{(j)}} + \alpha_j I_M\right)^{-1}\right)$$

wherein $\gamma_{j,j',k}$ (with k=1, ..., K) is the k-th entry of the vector $\gamma_{j,j'} \in \mathbb{C}^{K \times 1}$ which is such that:

$$(I - A'_{j,j'})\gamma = b'_{j,j'}$$

wherein $A'_{j,j'} \in \mathbb{C}^{K \times K}$ is a matrix having an entry at each index l, equal to:

$$[A'_{j,j'}]_{\ell,t} = \frac{\left(\sqrt{c_{0,t}^{(j)}c_{0,t}^{(j')}} + \sqrt{c_{1,t}^{(j)}c_{1,t}^{(j')}}\,\rho_t^{(j,j')}\right)^2}{M(1+m_t^{(j)})(1+m_t^{(j')})} \frac{\mathrm{Trace}(\Theta_t Q_o^{(j')}\Theta_\ell Q_o^{(j)})}{M}$$

$b'_{j,j'} \in \mathbb{C}^{K\times 1}$ is a vector having an entry at each index 1 equal to $$[b'_{j,j'}]_\ell = \frac{1}{M}\sum_{t=1}^{K}\frac{\sqrt{c_{0,t}^{(j)}c_{0,t}^{(j')}} + \sqrt{c_{1,t}^{(j)}c_{1,t}^{(j')}}\,\rho_t^{(j,j')}}{(1+m_t^{(j)})(1+m_t^{(j')})} \frac{\mathrm{Trace}(\Theta_t Q_o^{(j')}\Theta_\ell Q_o^{(j)})}{M}$$

and wherein $\Phi_{j,k}\in\mathbb{R}$ is defined as follows:

$$\Phi_{j,k} = \frac{\mathrm{Trace}(\Theta_k E_j E_j^\dagger Q_o^{(j)})}{M}$$

The aforementioned optimal power scaling vector $\mu^*$ can be reformulated as:

$$\mu^* = \max_\mu \sum_{k=1}^{K} \log\left(1 + \frac{\mu^T A_k \mu}{\frac{1}{P} + \mu^T B_k \mu}\right)$$

such that $\|C\mu\|_F^2 = 1$, $\mu\in\mathbb{R}^{n\times 1}$ wherein $\|Z\|_F$ represents the Frobenius norm, i.e. the square root of the sum of the square values of the coefficients of Z, wherein $A_k$ is representative of the channel on which are carried symbols intended to the k-th receiver among the K receivers from a long term and asymptotic perspective, $B_k$ is representative of the channel on which are carried symbols intended to all receivers but the k-th receiver and generating interference with symbols intended to said k-th receiver from a long term and asymptotic perspective, and C is representative of the power constraint, and $A_k$ is a constant matrix having an entry at each index j,j' equal to:

$$[A_k]_{j,j'} = \sqrt{\frac{c_{0,k}^{(j)} c_{0,k}^{(j')}}{\Gamma_{j,j}^o(I_M)\Gamma_{j',j'}^o(I_M)}} \frac{\Phi_{j,k}\Phi_{j',k}}{(1+m_k^{(j)})(1+m_k^{(j')})}$$

and $B_k$ is a constant matrix having an entry at each index j, j' equal to:

$$[B_k]_{j,j'} = \frac{1}{\sqrt{\Gamma_{j,j}^o(I_M)\Gamma_{j',j'}^o(I_M)}}$$

$$\left(\Gamma_{j,j'}^o(E_{j'}E_j^\dagger \Theta_k E_j E_j^\dagger) - 2\mathrm{Re}\{\Gamma_{j,j'}^o(\Theta_k E_j E_j^\dagger)\}\frac{c_{0,k}^{(j')}\Phi_{j',k}}{1+m_k^{(j')}} + \Phi_{j',k}\Phi_{j,k}\gamma_{j,j',k}\frac{c_{0,k}^{(j)}c_{0,k}^{(j')} + \rho_k^{(j,j')}c_{2,k}^{(j)}c_{2,k}^{(j')}}{(1+m_k^{(j)})(1+m_k^{(j')})}\right)$$

$$C = \mathrm{diag}\left(\sqrt{\frac{\Gamma_{1,1}^o(E_1 E_1^\dagger)}{\Gamma_{1,1}^o(I_M)}},\ldots,\sqrt{\frac{\Gamma_{n,n}^o(E_n E_n^\dagger)}{\Gamma_{n,n}^o(I_M)}}\right)$$

wherein $\mathrm{Re}\{X\}$ represents the real part of the complex input X, and diag( ) is a function that forms a diagonal matrix of size Z when Z entries are input to said function.

In a following step S303, the transmitter 120a enables configuring the regularized zero-forcing precoder T, for what concerns the transmitter 120a, with the regularization coefficients $\alpha_j$ and with the power scaling factor $\mu_j$ as obtained by the optimization performed in the step S302, with j representing the transmitter 120a among the transmitters of the wireless communication system 100. When the algorithm of FIG. 3 is performed by the server 130, the server 130 transmits to each transmitter of the wireless communication system 100 the regularization coefficients $\alpha_j$ and the power scaling factor $\mu_j$ as obtained by the optimization performed in the step S302, with j representing said transmitter among the transmitters of the wireless communication system 100; each transmitter then enables configuring the regularized zero-forcing precoder T, for what concerns said transmitter, with the regularization coefficients $\alpha_j$ and with the power scaling factor $\mu_j$ provided by the server 130. Effective configuration of the regularized zero-forcing precoder T is detailed hereafter with regard to FIG. 6.

The algorithm of FIG. 3 is preferably repeated when the long-term statistics, as depicted with regard to the step S301, evolve.

FIG. 4 schematically represents an algorithm for determining the power scaling factors vector $\mu$ in the scope of the algorithm of FIG. 3, in a particular embodiment of the present invention. Let's illustratively consider that the algorithm of FIG. 5 is performed by the transmitter 120a.

In the following, the notation $v^{[z]}$ represents the value of v at the iteration z of a loop in which convergence of the value of v is sought.

In a step S401, the transmitter 120a initializes $\mu^{[0]}$ with default values, e.g. the same value for each entry, such that $\|C\mu^{[0]}\|^2=1$, and further sets a local variable t to the value "0".

In a following step S402, the transmitter 120a computes $r_k(\mu^{[t]})$ as follows:

$$r_k(\mu^{[t]}) = \frac{\frac{1}{P} + (\mu^{[t]})^T B_k \mu^{[t]}}{\frac{1}{P} + (\mu^{[t]})^T (A_k + B_k)\mu^{[t]}}, \forall k$$

In a following step S403, the transmitter 120a initializes $w^{[0]}$ with default values, e.g. the same value for each entry, such that $\|Cw^{[0]}\|^2=1$, and sets a local variable i to the value "0".

In a following step S404, the transmitter 120a computes $\beta_k^{[i+1]}$ as follows:

$$\beta_k^{[i+1]} = \frac{r_k(\mu^{[t]})\left(\frac{1}{P} + (w^{[i]})^T B_k w^{[i]}\right)}{\frac{1}{P} + (w^{[i]})^T (A_k + B_k) w^{[i]}}$$

and the transmitter 120a computes $u_k^{[i+1]}$ as follows:

$$u_k^{[i+1]} = \frac{1}{\frac{1}{P} + (w^{[i]})^T(A_k + B_k)w^{[i]}}}$$

and the transmitter 120a computes $w^{[i+1]}$ as follows:

$$w^{[i+1]} = \underset{w}{\operatorname{argmin}} \sum_{k=1}^{K} u_k^{[i+1]} \cdot \left( \frac{1}{r_k(\mu^{[t]})} \cdot \left( \frac{1}{P} + w^T B_k w \right) - \beta_k^{[i+1]} \cdot \left( \frac{1}{P} + w^T(A_k + B_k)w \right) \right)$$

such that $\|Cw^{[i+1]}\|^2 \leq 1$.

This step can be solved by using a semi-definite programming relaxation and the results from Shapiro-Barvinok-Pataki in "*On the Rank of Extreme Matrices in Semi-definite Programs and the Multiplicity of Optimal Eigenvalues*", *Mathematics of Operations Research*, 23(2):339-358, by G. Pataki, the new optimization problem being relaxed in the sense that the matrix $W^{[i+1]}$ is computed by performing the following optimization:

$$W^{[i+1]} = \underset{W}{\operatorname{argmin}} \sum_{k=1}^{K} u_k^{[i+1]} \cdot \left( \frac{1}{r_k(\mu^{[t]})} \cdot \left( \frac{1}{P} + \operatorname{Trace}(B_k W) \right) - \beta_k^{[i+1]} \cdot \left( \frac{1}{P} + \operatorname{Trace}((A_k + B_k)W) \right) \right)$$

such that $\operatorname{Trace}(C^T C W) \leq 1$ and $W$ is positive semi-definite.

Then, $w^{[i+1]}$ can be found from $W^{[i+1]}$ by using an singular value decomposition (SVD), further by selecting the highest singular value s of $W^{[i+1]}$ and its associated eigenvector w', and further by setting $w^{[i+1]} = \sqrt{s} w'$. Another approach is to compute the Choleski decomposition $W^{[i+1]} = W'W'^T$ so as to obtain W' for finally obtaining $w^{[i+1]} = 1_{1 \times n} W'$ wherein $1_{1 \times n}$ is a row matrix of size n filled with values equal to "1".

In a following step S405, the transmitter 120a increments the local variable i by one unit.

In a following step S406, the transmitter 120a checks whether convergence has been reached with respect to $w^{[i]}$. If such convergence has been reached, a step S407 is performed; otherwise, the step S404 is repeated.

In the step S407, the transmitter 120a assigns the value of $w^{[i]}$ to $\mu^{[t+1]}$.

In a following step S408, the transmitter 120a increments the local variable t by one unit.

In a following step S409, the transmitter 120a checks whether convergence has been reached with respect to $\mu^{[t]}$. If such convergence has been reached, a step S410 is performed; otherwise, the step S402 is repeated.

In the step S410, the transmitter 120a considers, with $\mu^{[t]}$, having obtained the appropriate value $\mu^*$ of the power scaling factors vector $\mu$.

FIG. 5 schematically represents an algorithm for jointly determining the power scaling factors $\mu_j$ (j=1 to n) and the regularization coefficients $\alpha_j$ (j=1 to n) for enabling configuring the regularized zero-forcing precoder T intended to be applied for transmitting data, in a cooperative manner, from the plurality of transmitters 120a, 120b toward the plurality of receivers 110a, 110b in the wireless communication system 100. The algorithm of FIG. 5 is an alternative with respect to the algorithm of FIG. 3. The algorithm of FIG. 5 differs from the algorithm of FIG. 3 in that the regularization coefficients $\alpha_j$ are, in the algorithm of FIG. 5, jointly optimized with the power scaling factors $\mu_j$. The algorithm of FIG. 5 is performed in parallel by each transmitter 120a, 120b of the wireless communication system 100 in the scope of the architecture shown in FIG. 1A, and the algorithm of FIG. 5 is performed by the server 130 in the scope of the architecture shown in FIG. 1B. Let's illustratively consider that the algorithm of FIG. 5 is performed by the transmitter 120a.

In a step S501, the transmitter 120a obtains long-term statistics, as in the step S301 described hereinbefore with regard to FIG. 3.

In a following step S502, the transmitter 120a jointly obtains the power scaling factors vector $\mu$ and the regularization coefficients vector $\alpha$ by solving an optimization problem that can be formulated as a function of the asymptotic expression $\operatorname{SINR}_k^o$ of the signal to noise ratio from the standpoint of each receiver (as identified by the index k taking the values from 1 to K), as follows, wherein $\alpha^*$ represents the optimized regularization coefficients vector $\alpha$:

$$(\alpha^*, \mu^*) = \underset{(\alpha,\mu)}{\operatorname{argmax}} \sum_{k=1}^{K} \log(1 + \operatorname{SINR}_k^o)$$

such that $$\sum_{j=1}^{n} \mu_j^2 \frac{\Gamma_{j,j}^o(E_j E_j^\dagger)}{\Gamma_{j,j}^o(I_M)} = 1$$

The aforementioned optimal power scaling factors and regularization coefficients joint optimization can be reformulated as:

$$(\alpha^*, \mu^*) = \underset{\alpha}{\operatorname{max}} \underset{\mu}{\operatorname{max}} \sum_{k=1}^{K} \log(1 + \operatorname{SINR}_k^o)$$

such that $$\sum_{j=1}^{n} \mu_j^2 \frac{\Gamma_{j,j}^o(E_j E_j^\dagger)}{\Gamma_{j,j}^o(I_M)} = 1$$

In a particular embodiment, it means firstly applying the regularization coefficients optimization as described in the already-mentioned document "*Robust Regularized ZF in Decentralized Broadcast Channel with Correlated CSI Noise*", Qianrui Li et al, 53rd Annual Allerton Conference on Communication, Control and Computing, 2015, then applying the power scaling vector optimization described hereinbefore with regard to FIG. 3, then reiterating said regularization coefficients optimization, and again applying the power scaling vector optimization described hereinbefore with regard to FIG. 3, and so on until convergence. It has to be noted that, so as to apply the regularization coefficients optimization as described in said document, the channel matrix H defined in said document is replaced by $H\Delta\mu$, wherein $\Delta\mu$ is equivalent to a block diagonal matrix, each block being of size $M_{TX} \times M_{TX}$ such that, considering any j-th block of said block diagonal matrix, said block is equivalent to the identity matrix $I_{M_{TX}}$ times the power scaling factor $\mu_j$.

In a following step S503, the transmitter 120a enables configuring the regularized zero-forcing precoder T, for what concerns the transmitter 120a, with the regularization coefficients $\alpha_j$ and with the power scaling factor $\mu_j$, both as obtained by the joint optimization performed in the step S502, with j representing the transmitter 120a among the transmitters of the wireless communication system 100. When the algorithm of FIG. 5 is performed by the server 130, the server 130 transmits to each transmitter of the wireless communication system 100 the regularization coefficients $\alpha_j$ and the power scaling factor $\mu_j$, both as obtained by the joint optimization performed in the step S502, with j representing said transmitter among the transmitters of the wireless communication system 100; each transmitter of the wireless communication system 100 then enables configuring the regularized zero-forcing precoder T, for what concerns said transmitter, with the regularization coefficients $\alpha_j$ and with the power scaling factor as provided by the server 130. Effective configuration of the regularized zero-forcing precoder T is detailed hereafter with regard to FIG. 6.

The algorithm of FIG. 5 is preferably repeated when the long-term statistics, as depicted with regard to the step S501, evolve.

Figure 6:
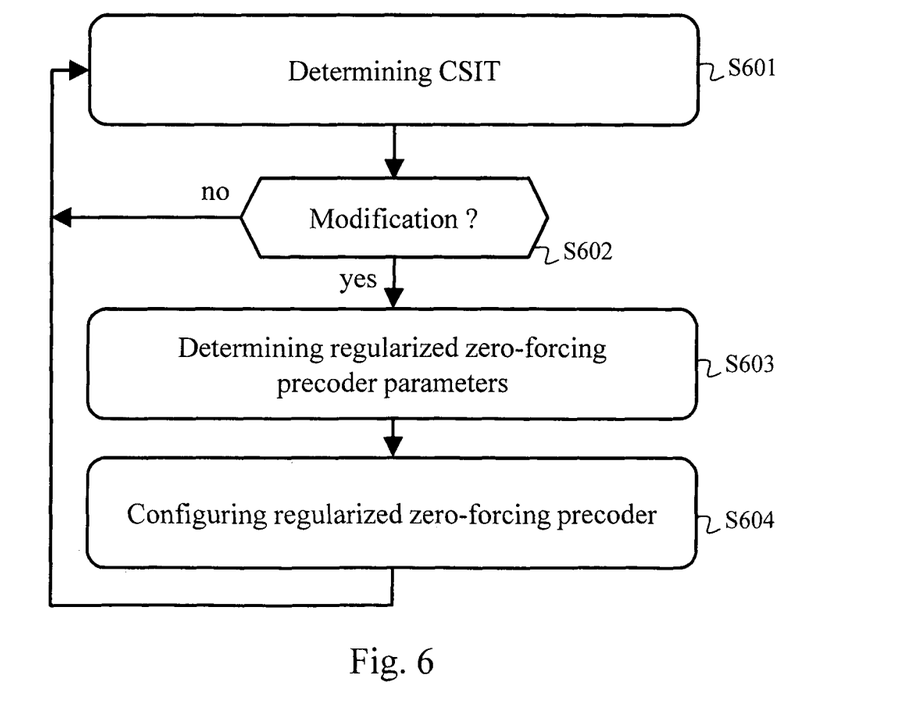
FIG. 6 schematically represents an algorithm for configuring the regularized zero-forcing precoder for transmitting data, in a cooperative manner, from the plurality of transmitters toward the plurality of receivers in the wireless communication system.

FIG. 6 schematically represents an algorithm for configuring the regularized zero-forcing precoder T for transmitting data, in a cooperative manner, from the plurality of transmitters 120a, 120b toward the plurality of receivers 110a, 110b in the wireless communication system 100. The algorithm of FIG. 6 is performed, independently, by each transmitter 120a, 120b of the wireless communication system 100. Let's illustratively consider that the algorithm of FIG. 5 is performed by the transmitter 120a.

In a step S601, the transmitter 120a obtains short-term CSIT representative of the MIMO channel H so as to obtain an estimation $\hat{H}$ of the effective MIMO channel H. Since quantization exists when the receivers 110a, 110b transmit feedback CSI to the transmitters 120a, 120b, and since each transmitter may not be able to receive feedback CSI from any receiver in the wireless communication system 100, the transmitters 120a, 120b might have respective estimations $\hat{H}^{(j)}$ of the effective MIMO channel H which are different from each other. It has to be noted that, contrary to the scope of the algorithms of FIGS. 3 and 5 wherein long-term CSIT statistics are used, short-term CSIT is used within the scope of the algorithm of FIG. 6 so as to attempt for each transmitter to obtain estimations $\hat{H}^{(j)}$ that is as close as possible to the effective MIMO channel H.

In a following step S602, the transmitter 120a checks whether the short-term CSIT information obtained in the step S601 shows modification of the MIMO channel H, i.e. checks whether the estimation $\hat{H}$ of the effective MIMO channel H has changed from the preceding iteration of the step S601. When the short-term CSIT information obtained in the step S601 shows modification of the MIMO channel H (and of course at the very first occurrence of the step S602), a step S603 is performed; otherwise, the step S601 is repeated once up-to-date CSI is fed back by at least one receiver of the wireless communication system 100.

In the step S603, the transmitter 120a determines the parameters of the regularized zero-forcing precoder T as follows:

$$T_j^{(j)} = \mu_j E_j^\dagger \left( \left(\hat{H}^{(j)}\right)^\dagger \hat{H}^{(j)} + M\alpha_j I_M \right)^{-1} (\hat{H}^{(j)})^\dagger + \frac{\sqrt{P}}{\sqrt{\Psi^{(j)}}} \right)$$

wherein $T_j^{(j)}$ represents the parameters of the regularized zero-forcing precoder T which have to be applied by the transmitter 120a (as represented by the index j), as determined by the transmitter 120a (as represented by the index j), and wherein $\Psi^{(j)}$ is a power normalization scalar defined as follows:

$$\Psi^{(j)} = \|((\hat{H}^{(j)})^\dagger \hat{H}^{(j)} + M\alpha_j I_M)^{-1} (\hat{H}^{(j)})^\dagger\|_F^2$$

In the following step S604, the transmitter 120a configures the regularized zero-forcing precoder T, for what concerns the transmitter 120a with the parameters determined in the step S602. The transmissions from the transmitters 120a, 120b to the receivers 110a, 110b are then performed by using the regularized zero-forcing precoder as configured in the step S604. Then the step S601 is repeated so as to obtain short-term CSIT.

The invention claimed is:

1. A method for determining parameters for configuring a regularized zero-forcing precoder T applied to a plurality of n transmitters for transmitting data from the plurality of n transmitters to a plurality of K receivers via a Multiple-Input Multiple Output MIMO transmission channel in a wireless communication system, each transmitter having a quantity $M_{TX}$ of transmit antennas, each receiver having a single receive antenna, $K \leq nM_{TX} = M$, characterized in that the method comprises a first phase comprising:

obtaining long-term statistics about observations of the MIMO transmission channel as follows, for any and all j-th transmitter among the n transmitters and any and all k-th receiver among the K receivers:

$\sigma_k^{(j)}$, which is representative of a ratio between an average power of the MIMO channel from said j-th transmitter to said k-th receiver and an average power of an estimation noise in Channel State Information at Transmitter CSIT obtained, at said j-th transmitter, when estimating the MIMO channel from said j-th transmitter to said k-th receiver;

$\Theta_k$, which is a covariance matrix of the MIMO channel from said plurality of n transmitters toward said k-th receiver; and $\rho_k^{(j,j')}$, which is representative of a correlation between $q_k^{(j)}$ and $q_k^{(j')}$, wherein $q_k^{(j)}$ is a whitened estimation noise, obtained at the j-th transmitter, in the CSIT of the MIMO channel between said j-th transmitter and said k-th receiver, and wherein $q_k^{(j')}$ is a whitened estimation noise, obtained at the j'-th transmitter, in the CSIT of the MIMO channel between said j'-th transmitter and said k-th receiver;

obtaining a power scaling factors vector $\mu^*$ gathering power scaling factors $\mu_j$ for any and all j-th transmitter among the n transmitters and meeting a power constraint P, by solving an optimization problem as a function of a signal to noise ratio asymptotic expression $SINR_k^\circ$ from a standpoint of each receiver as follows:

$$\mu^* = \underset{\mu}{\operatorname{argmax}} \sum_{k=1}^{K} \log(1 + SINR_k^\circ)$$

such that $$\sum_{j=1}^{n} \mu_j^2 \frac{\Gamma_{j,j}^\circ(E_j E_j^\dagger)}{\Gamma_{j,j}^\circ(I_M)} = 1$$

wherein $E_j^\dagger \in \mathbb{C}^{M_{TX} \times M}$ is a matrix defined as follows:

$$E_j^\dagger = [0_{M_{TX} \times (j-1)M_{TX}} I_{M_{TX}} 0_{M_{TX} \times (n-j)M_{TX}}]$$

wherein the notation $I_Z$ means an identity matrix or sub-matrix of size Z and the notation $O_{Z \times W}$ means a null sub-matrix of size $Z \times W$, wherein the asymptotic expression $SINR_k^o$ of the signal to noise ratio from a standpoint of any k-th receiver among the K receivers is as follows:

$$SINR_k^o = \frac{P\left(\sum_{j=1}^n \mu_j \sqrt{\frac{c_{0,k}^{(j)}}{\Gamma_{j,j}^o(I_M)}} \frac{\Phi_{j,k}}{1+m_k^{(j)}}\right)^2}{1+I_k^o}$$

wherein $I_k^o$ is as follows:

$$I_k^o = P \sum_{j=1}^n \sum_{j'=1}^n \frac{\mu_j \mu_{j'}}{\sqrt{\Gamma_{j,j}^o(I_M)\Gamma_{j',j'}^o(I_M)}}$$

$$\left(\Gamma_{j,j'}^o(E_{j'}, E_{j'}^\dagger \Theta_k E_j E_j^\dagger) - 2\Gamma_{j,j'}^o(\Theta_k E_j E_j^\dagger)\frac{c_{0,k}^{(j')}\Phi_{j',k}}{1+m_k^{(j')}} + \Phi_{j',k}\Phi_{j,k}\gamma_{j,j',k}\frac{c_{0,k}^{(j)}c_{0,k}^{(j')} + \rho_k^{(j,j')}c_{2,k}^{(j)}c_{2,k}^{(j')}}{(1+m_k^{(j)})(1+m_k^{(j')})}\right)$$

wherein $\Gamma_{j,j'}^o$ is a function defined as follows:

$$\Gamma_{j,j'}^o(X) =$$

$$\frac{1}{M}\sum_{k=1}^K \frac{\left(\sqrt{c_{0,k}^{(j)}c_{0,k}^{(j')}} + \sqrt{c_{1,k}^{(j)}c_{1,k}^{(j')}} \rho_k^{(j,j')}\right)\frac{1}{M}\text{Trace}(\Theta_k Q_o^{(j')}XQ_o^{(j)})}{(1+m_k^{(j)})(1+m_k^{(j')})} +$$

$$\frac{1}{M}\sum_{k=1}^K \frac{\left(\sqrt{c_{0,k}^{(j)}c_{0,k}^{(j')}} + \sqrt{c_{1,k}^{(j)}c_{1,k}^{(j')}} \rho_k^{(j,j')}\right)^2 \gamma_{j,j',k}\frac{1}{M}\text{Trace}(\Theta_k Q_o^{(j')}XQ_o^{(j)})}{(1+M_k^{(j)})(1+m_k^{(j')})}$$

with $c_{0,k}^{(j)} = 1 - (\sigma_k^{(j)})^2$ and $c_{1,k}^{(j)} = (\sigma_k^{(j)})^2$ and $c_{2,k}^{(j)} = \sigma_k^{(j)}\sqrt{1-(\sigma_k^{(j)})^2}$ wherein $Q_o^{(j)} = \left(\frac{1}{M}\sum_{k=1}^K \frac{\Theta_k}{1+m_k^{(j)}} + \alpha_j I_M\right)^{-1}$ wherein $m_k^{(j)} = \frac{1}{M}\text{Trace}\left(\Theta_k\left(\frac{1}{M}\sum_{\ell=1}^K \frac{\Theta_\ell}{1+m_\ell^{(j)}} + \alpha_j I_M\right)^{-1}\right)$ wherein $\alpha_j$ is a regularization coefficient of the regularized zero-forcing precoder T, wherein $\gamma_{j,j',k}$ (with k=1, ..., K) is a k-th entry of the vector $\gamma_{j,j'} \in \mathbb{C}^{K \times 1}$ such that:

$$(I - A'_{j,j'})\gamma = b'_{j,j'}$$

wherein $A'_{j,j'} \in \mathbb{C}^{K \times K}$ is a matrix having an entry at each index l, t equal to:

$$[A'_{j,j'}]_{\ell,t} = \frac{\left(\sqrt{c_{0,t}^{(j)}c_{0,t}^{(j')}} + \sqrt{c_{1,t}^{(j)}c_{1,t}^{(j')}} \rho_t^{(j,j')}\right)^2}{M(1+m_t^{(j)})(1+m_t^{(j')})} \frac{\text{Trace}(\Theta_\ell Q_o^{(j')}\Theta_\ell Q_o^{(j)})}{M}$$

wherein $b'_{j,j'}$ is a vector having an entry at each index l equal to $$[b'_{j,j'}]_\ell = \frac{1}{M}\sum_{t=1}^K \frac{\sqrt{c_{0,t}^{(j)}c_{0,t}^{(j')}} + \sqrt{c_{1,t}^{(j)}c_{1,t}^{(j')}} \rho_t^{(j,j')}}{(1+m_t^{(j)})(1+m_t^{(j')})} \frac{\text{Trace}(\Theta_\ell Q_o^{(j')}\Theta_\ell Q_o^{(j)})}{M}$$

and wherein $\Phi_{j,k}$ is defined as follows:

$$\Phi_{j,k} = \frac{\text{Trace}(\Theta_k E_j E_j^\dagger Q_o^{(j)})}{M}$$

and in that the method further comprises a second phase, performed independently by any and all j-th transmitter of said plurality of n transmitters, comprising:

obtaining an estimation $\hat{H}^{(j)}$ of the MIMO transmission channel from a standpoint of each j-th transmitter of said plurality of n transmitters;

configuring the regularized zero-forcing precoder T as follows:

$$T_j^{(j)} = \mu_j E_j^\dagger\left(\left((\hat{H}^{(j)})^\dagger \hat{H}^{(j)} + M\alpha_j I_M\right)^{-1}(\hat{H}^{(j)})^\dagger \frac{\sqrt{P}}{\sqrt{\Psi^{(j)}}}\right)$$

wherein $T_j^{(j)}$ represents the parameters of the regularized zero-forcing precoder T which are applied by said j-th transmitter, and wherein $\Psi^{(j)}$ is a power normalization scalar defined as follows:

$$\Psi^{(j)} = \|((\hat{H}^{(j)})^\dagger \hat{H}^{(j)} + M\alpha_j I_M)^{-1}(\hat{H}^{(j)})^\dagger\|_F^2$$

wherein $\mu_j$ results from execution of the first phase.

2. The method according to claim 1, wherein solving the optimization problem as a function of the signal to noise ratio asymptotic expression $SINR_k^o$ from the standpoint of each receiver consists in solving:

$$\mu^* = \max_\mu \sum_{k=1}^K \log\left(1 + \frac{\mu^T A_k \mu}{\frac{1}{P} + \mu^T B_k \mu}\right)$$

such that $\|C\mu\|_F^2 = 1$, wherein $A_k$ is representative of a channel on which are carried symbols for the k-th receiver among the K receivers from a long term and asymptotic perspective, $B_k$ is representative of the channel on which are carried symbols for all receivers but said k-th receiver and generating interference with symbols for said k-th receiver from a long term and asymptotic perspective, and C is representative of the power constraint, and $A_k$ is a constant matrix having an entry at each index j,j' equal to:

$$[A_k]_{j,j'} = \sqrt{\frac{c_{0,k}^{(j)} c_{0,k}^{(j')}}{\Gamma_{j,j}^o(I_M)\Gamma_{j',j'}^o(I_M)}} \frac{\Phi_{j,k}\Phi_{j',k}}{(1+m_k^{(j)})(1+m_k^{(j')})}$$

and $B_k$ is a constant matrix having an entry at each index j,j' equal to:

$$[B_k]_{j,j'} = \frac{1}{\sqrt{\Gamma_{j,j}^o(I_m)\Gamma_{j',j'}^o(I_m)}}$$

$$\left( \Gamma_{j,j'}^o(E_{j'}E_j^\dagger \Theta_k E_j E_j^\dagger) - 2Re\{\Gamma_{j,j'}^o(\Theta_k E_j E_j^\dagger)\} \frac{c_{0,k}^{(j')}\Phi_{j',k}}{1+m_k^{(j')}} + \Phi_{j',k}\Phi_{j,k}\gamma_{j,j',k} \frac{c_{0,k}^{(j)}c_{0,k}^{(j')} + \rho_k^{(j,j')}c_{2,k}^{(j)}c_{2,k}^{(j')}}{(1+m_k^{(j)})(1+m_k^{(j')})} \right)$$

$$C = \text{diag}\left( \sqrt{\frac{\Gamma_{1,1}^o(E_1 E_1^\dagger)}{\Gamma_{1,1}^o(I_M)}}, \ldots, \sqrt{\frac{\Gamma_{n,n}^o(E_n E_n^\dagger)}{\Gamma_{n,n}^o(I_M)}} \right)$$

wherein Re{X} represents a real part of a complex input X, and diag ( ) is a function that forms a diagonal matrix of size Z when Z entries are input to said function.

3. The method according to claim 1, wherein the regularization coefficient $\alpha_j$ is jointly optimized with the power scaling factor $\mu_j$ by solving:

$$(\alpha^*, \mu^*) = \underset{(\alpha,\mu)}{\text{argmax}} \sum_{k=1}^{K} \log(1 + SINR_k^o)$$

such that $$\sum_{j=1}^{n} \mu_j^2 \frac{\Gamma_{j,j}^o(E_j E_j^\dagger)}{\Gamma_{j,j}^o(I_M)} = 1$$

wherein $\alpha^*$ is a regularization coefficients vector gathering the regularization coefficients $\alpha_j$ for any and all j-th transmitter among the n transmitters.

4. The method according to claim 1, wherein the first phase is implemented in a distributed fashion by any and all j-th transmitter of said plurality of n transmitters, and in that said plurality of n transmitters shares said long-term statistics.

5. The method according to claim 1, wherein a server obtains said long-term statistics from said plurality of n transmitters and the server implements said first phase on behalf of any and all j-th transmitter of said plurality of n transmitters.

6. A non-transitory information storage medium that stores a computer program comprising program code instructions which can be loaded in a programmable device for implementing the method according to claim 1, when the program code instructions are run by the programmable device.

7. A wireless communication system configured for determining parameters for configuring a regularized zero-forcing precoder T applied to a plurality of n transmitters for transmitting data from the plurality of n transmitters to a plurality of K receivers via a Multiple-Input Multiple Output MIMO transmission channel in the wireless communication system, each transmitter having a quantity $M_{TX}$ of transmit antennas, each receiver having a single receive antenna, $K \leq nM_{TX} = M$, characterized in that the wireless communication system comprises a processor to execute a program; and a memory to store the program which, when executed by the processor, performs a process of, implementing a first phase comprising:

obtaining long-term statistics about observations of the MIMO transmission channel as follows, for any and all j-th transmitter among the n transmitters and any and all k-th receiver among the K receivers:

$\sigma_k^{(j)}$, which is representative of a ratio between an average power of the MIMO channel from said j-th transmitter to said k-th receiver and an average power of an estimation noise in Channel State Information at Transmitter CSIT obtained, at said j-th transmitter, when estimating the MIMO channel from said j-th transmitter to said k-th receiver;

$\Theta_k$, which is a covariance matrix of the MIMO channel from said plurality of n transmitters toward said k-th receiver; and $\rho_k^{(j,j')}$, which is representative of a correlation between $q_k^{(j)}$ and $q_k^{(j')}$, wherein $q_k^{(j)}$ is a whitened estimation noise, obtained at the j-th transmitter, in the CSIT of the MIMO channel between said j-th transmitter and said k-th receiver, and wherein $q_k^{(j')}$ is a whitened estimation noise, obtained at the j'-th transmitter, in the CSIT of the MIMO channel between said j'-th transmitter and said k-th receiver;

obtaining a power scaling factors vector $\mu^*$ gathering power scaling factors $\mu_j$ for any and all j-th transmitter among the n transmitters and meeting a power constraint P, by solving an optimization problem as a function of a signal to noise ratio asymptotic expression $SINR_k^o$ from a standpoint of each receiver as follows:

$$\mu^* = \underset{\mu}{\text{argmax}} \sum_{k=1}^{K} \log(1 + SINR_k^o)$$

such that $$\sum_{j=1}^{n} \mu_j^2 \frac{\Gamma_{j,j}^o(E_j E_j^\dagger)}{\Gamma_{j,j}^o(I_M)} = 1$$

wherein $E_j^\dagger \in \mathbb{C}^{M_{TX} \times M}$ is a matrix defined as follows:

$$E_j^\dagger = [0_{M_{TX} \times (j-1)M_{TX}} I_{M_{TX}} 0_{M_{TX} \times (n-j)M_{TX}}]$$

wherein the notation $I_Z$ means an identity matrix or sub-matrix of size Z and the notation $0_{Z \times W}$ means a null sub-matrix of size Z×W, wherein the asymptotic expression $SINR_k^o$ of the signal to noise ratio from a standpoint of any k-th receiver among the K receivers is as follows:

$$SINR_k^o = \frac{P\left(\sum_{j=1}^{n} \mu_j \sqrt{\frac{c_{0,k}^{(j)}}{\Gamma_{j,j}^o(I_M)}} \frac{\Phi_{j,k}}{1+m_k^{(j)}}\right)^2}{1 + I_k^o}$$

wherein $I_k^o$ is as follows:

$$I_k^o = P\sum_{j=1}^{n}\sum_{j'=1}^{n} \frac{\mu_j \mu_{j'}}{\sqrt{\Gamma_{j,j}^o(I_M)\Gamma_{j',j'}^o(I_M)}} \left( \Gamma_{j,j'}^o(E_{j'}E_j^\dagger \Theta_k E_j E_j^\dagger) - 2\Gamma_{j,j'}^o(\Theta_k E_j E_j^\dagger) \right.$$

-continued $$\left. \frac{c_{0,k}^{(j')}\Phi_{j',k}}{1+m_k^{(j')}} + \Phi_{j',k}\Phi_{j,k}\gamma_{j,j',k}\frac{c_{0,k}^{(j)}c_{0,k}^{(j')} + \rho_k^{(j,j')}c_{2,k}^{(j)}c_{2,k}^{(j')}}{\left(1+m_k^{(j)}\right)\left(1+m_k^{(j')}\right)}\right)$$

wherein $\Gamma_{j,j'}^o$ is a function defined as follows:

$$\Gamma_{j,j'}^o(X) = $$

$$\frac{1}{M}\sum_{k=1}^{K}\frac{\left(\sqrt{c_{0,k}^{(j)}c_{0,k}^{(j')}}+\sqrt{c_{1,k}^{(j)}c_{1,k}^{(j')}}\,\rho_k^{(j,j')}\right)\frac{1}{M}\operatorname{Trace}\!\left(\Theta_k Q_o^{(j')} X Q_o^{(j)}\right)}{\left(1+m_k^{(j)}\right)\left(1+m_k^{(j')}\right)}+\frac{1}{M}$$

$$\sum_{k=1}^{K}\frac{\left(\sqrt{c_{0,k}^{(j)}c_{0,k}^{(j')}}+\sqrt{c_{1,k}^{(j)}c_{1,k}^{(j')}}\,\rho_k^{(j,j')}\right)^2\gamma_{j,j',k}\frac{1}{M}\operatorname{Trace}\!\left(\Theta_k Q_o^{(j')} X Q_o^{(j)}\right)}{\left(1+m_k^{(j)}\right)\left(1+m_k^{(j')}\right)}$$

with $$c_{0,k}^{(j)} = 1-\left(\sigma_k^{(j)}\right)^2$$

and $$c_{1,k}^{(j)} = \left(\sigma_k^{(j)}\right)^2$$

and $$c_{2,k}^{(j)} = \sigma_k^{(j)}\sqrt{1-\left(\sigma_k^{(j)}\right)^2}$$

wherein $$Q_o^{(j)} = \left(\frac{1}{M}\sum_{k=1}^{K}\frac{\Theta_k}{1+m_k^{(j)}}+\alpha_j I_M\right)^{-1}$$

wherein $$m_k^{(j)} = \frac{1}{M}\operatorname{Trace}\!\left(\Theta_k\left(\frac{1}{M}\sum_{l=1}^{K}\frac{\Theta_l}{1+m_l^{(j)}}+\alpha_j I_M\right)^{-1}\right)$$

wherein $\alpha_j$ is a regularization coefficient of the regularized zero-forcing precoder T, wherein $\gamma_{j,j',k}$ (with k=1, . . . , K) is a k-th entry of the vector $\gamma_{j,j'}\in\mathbb{C}^{K\times 1}$ such that:

$$(I-A'_{j,j'})\gamma = b'_{j,j'}$$

wherein $A'_{j,j'}\in\mathbb{C}^{K\times K}$ is a matrix having an entry at each index l, t equal to:

$$[A'_{j,j'}]_{\ell,t} = \frac{\left(\sqrt{c_{0,t}^{(j)}c_{0,t}^{(j')}}+\sqrt{c_{1,t}^{(j)}c_{1,t}^{(j')}}\,\rho_t^{(j,j')}\right)^2}{M\left(1+m_t^{(j)}\right)\left(1+m_t^{(j')}\right)}\frac{\operatorname{Trace}\!\left(\Theta_t Q_o^{(j')}\Theta_\ell Q_o^{(j)}\right)}{M}$$

wherein $b'_{j,j'}$ is a vector having an entry at each index l equal to $$[b'_{j,j'}]_\ell = \frac{1}{M}\sum_{t=1}^{K}\frac{\sqrt{c_{0,t}^{(j)}c_{0,t}^{(j')}}+\sqrt{c_{1,t}^{(j)}c_{1,t}^{(j')}}\,\rho_t^{(j,j')}}{\left(1+m_t^{(j)}\right)\left(1+m_t^{(j')}\right)}\frac{\operatorname{Trace}\!\left(\Theta_t Q_o^{(j')}\Theta_\ell Q_o^{(j)}\right)}{M}$$

and wherein $\Phi_{j,k}$ is defined as follows:

$$\Phi_{j,k} = \frac{\operatorname{Trace}\!\left(\Theta_k E_j E_j^\dagger Q_o^{(j)}\right)}{M}$$

and in that the processor further performs a process of implementing a second phase, performed independently by any and all j-th transmitter of said plurality of n transmitters, comprising:

obtaining an estimation $\hat{H}^{(j)}$ of the MIMO transmission channel from a standpoint of each j-th transmitter of said plurality of n transmitters;

configuring the regularized zero-forcing precoder T as follows:

$$T_j^{(j)} = \mu_j E_j^\dagger\!\left(\left(\hat{H}^{(j)}\right)^\dagger \hat{H}^{(j)} + M\alpha_j I_M\right)^{-1}\!\left(\hat{H}^{(j)}\right)^\dagger\frac{\sqrt{P}}{\sqrt{\Psi^{(j)}}}\right)$$

wherein $T_j^{(j)}$ represents the parameters of the regularized zero-forcing precoder T which are applied by said j-th transmitter, and wherein $\Psi^{(j)}$ is a power normalization scalar defined as follows:

$$\Psi^{(j)} = \left\|\left((\hat{H}^{(j)})^\dagger \hat{H}^{(j)} + M\alpha_j I_M\right)^{-1}(\hat{H}^{(j)})^\dagger\right\|_F^2$$

wherein $\mu_j$ results from execution of the first phase.

* * * * *